(12) United States Patent
Cole

(10) Patent No.: US 8,533,013 B2
(45) Date of Patent: Sep. 10, 2013

(54) CONTENT MANAGEMENT

(75) Inventor: Robert J. Cole, San Mateo, CA (US)

(73) Assignee: Survcast Corporation, Burlingame, CA (US)

( * ) Notice: Subject to any disclaimer, the term of this patent is extended or adjusted under 35 U.S.C. 154(b) by 944 days.

(21) Appl. No.: 12/589,807

(22) Filed: Oct. 27, 2009

(65) Prior Publication Data

US 2010/0161382 A1 Jun. 24, 2010

Related U.S. Application Data

(60) Provisional application No. 61/108,847, filed on Oct. 27, 2008.

(51) Int. Cl.
*G06Q 10/00* (2012.01)

(52) U.S. Cl.
USPC ............ 705/7; 705/8; 705/10; 705/14

(58) Field of Classification Search
USPC ................................. 705/7, 8, 10, 14
See application file for complete search history.

(56) References Cited

U.S. PATENT DOCUMENTS

2008/0243586 A1* 10/2008 Dohring et al. ............... 705/10
2008/0313011 A1* 12/2008 Rose et al. .................... 705/10
2009/0106084 A1* 4/2009 Or ................................. 705/10

* cited by examiner

*Primary Examiner* — Nga B. Nguyen
(74) *Attorney, Agent, or Firm* — Sheppard, Mullin, Richter & Hampton LLP

(57) ABSTRACT

A content management system can have one or more of an aggregation engine, a survey engine, a polling engine, an apparent-interest engine, an explicit-interest engine, and a results processing engine.

15 Claims, 10 Drawing Sheets

400 →

CONTENT MANAGEMENT

CROSS-REFERENCE TO RELATED APPLICATIONS

This application claims priority to U.S. Provisional Patent Application 61/108,847, filed Oct. 27, 2008.

BACKGROUND

Demand for Internet content such as videos, images, news articles, tweets, and weblogs is limited by the time that people have to review such content. The supply of such content is growing exponentially and to a point where Internet search engines such as Google struggle to respond with results directing users to relevant content. In many cases results can include hundreds or thousands of references to content that may or may not be relevant to the immediate interests of the user. Helping people find quality content on-line that is relevant to their interests continues to be an overwhelming and complex process. Also, lack of relevancy combined with an overwhelming amount of on-line content increases the costs and complexities involved for advertiser that wish to target users with offerings relevant to their interests, or needs.

Internet content aggregators commonly referred to as "news aggregators" have emerged to address the growing issue of overwhelming content. A goal of these Internet services is to manage less, but more popular, content in one place in ways that make review easier and more interesting for users while improving the advertiser's ability to target offerings that are relevant to the user's interests. Users can refer what they believe to be popular content from any website to an aggregation hub so that other users may review the content, leave comments in reference to the content, and rank the content according to their likes and dislikes. If a user likes the content they give it a positive rating. This action results in improved visibility of the content and an increase in popularity. Conversely if users provide negative ratings this results in less visibility of the content and subsequently a decrease in popularity.

Many content aggregation websites have emerged. However, the growing volume of Internet content is now overwhelming these aggregators because the more users refer content to them the more overwhelming searching and reviewing content becomes for their other users. Moreover, some users have also learned how to manipulate rating systems provided by aggregators. For example, a small group of users can use rating features to bury popular content, which results in less visibility.

As explained on wikipedia.com in reference to Digg.com "the existence of the "bury" option has also been criticized as undemocratic and due to its anonymous nature, unaccountable, which often leads to expungement of criticism of hotbed topics that do not mesh with the prevailing view of the community," and goes on to explain that, "Certain Digg users have been accused of operating a "Bury Brigade" that tags news articles with which they disagree as spam, thus attempting to bury stories." In other words, a minority of users that may be negatively affected by certain content can reduce exposure of such content by using the bury feature. Therefore, visibility of content that is potentially valuable to the broader community can be reduced, or eliminated, and without accountability.

During the 2008 United States Presidential election the Los Angeles Times published an article dated Aug. 11, 2008 that stated, "A close look at campaign-oriented stories on Digg shows that, in the last 30 days, at least 28 stories critical of GOP Sen. John McCain have been mysteriously "buried"— meaning enough Digg users have voted against a story that the submission may no longer appear on the site's high-traffic front page."

As another example of how the "bury" option can be used to reduce visibility of content; when users rise up and post content on a news aggregator such as Digg.com relating to a complaint about a company's products or services, representatives from that company can bury it. This "bury" capability dilutes the value of centralized content aggregation for the user community majority because it reduces or eliminates exposure of the most controversial and compelling subject matter. Moreover, due to the "bury" issue the journalist, or blogger, or referring user that represents the controversial subject matter is left feeling helpless and discouraged in much the same way as people did prior to when consumer advocacy groups and class-action lawsuits formed to overcome such behavior off-line. Ultimately this issue negatively affects users as described herein as well as other participants that could benefit from the increased attention that centralized content with a high degree of user feedback could provide such as companies that desire to compete with better services, advertisers that wish to improve their ability to target users in relation to relevant subject matter, and publishers who are always looking for ways to engage users with compelling content.

Today most websites provide features enabling users to post their own comments in relation to published on-line content such as videos, images, news articles, tweets, and weblogs. Additionally, the use of RSS commonly translated as "Really Simple Syndication" or sometimes "Rich Site Summary" is a set of web feed formats used to publish frequently updated works. For example when a user subscribes to on-line content such as a news article that user will be notified when another user posts a comment related to the article. As described by wikipedia.com, "An RSS document (which is called a "feed", "web feed", or "channel") includes full or summarized text, plus metadata such as publishing dates and authorship," and goes on to explain that, "web feeds benefit readers who want to subscribe to timely updates from many sites into one place." Users have learned how to manipulate the comment and RSS features to spread unsolicited bulk offers e.g. spam, or propaganda in an effort to skew public opinion.

Using our previous example "when users rise up and post content relating to a complaint about a company's products or services on a website that," provides comment features; representatives from that company can easily and effectively skew public opinion by posting comments designed to mislead, or shift public opinion in relation to the complaint. It should be noted that the Internet allows users to voice their opinions with complete anonymity by using pseudonyms to hide their identity. Therefore, comment features enable anyone including those employed by the subject company to post comments that may be completely inaccurate and without accountability.

Additionally, the use of RSS features in relation to content comment features has become widespread on-line. Using the same example "when users rise up and post content relating to a complaint about a company's products or services on a website that," provides RSS features; representatives from that company can easily and effectively skew public opinion by posting comments designed to mislead, or shift public opinion in relation to the complaint then leveraging the RSS process that notifies all users that subscribed to the subject content that a comment has been added. This allows a minority of users to skew public opinion within the minority group effectively, quickly, and without accountability. Soon interest in the posted complaint dies.

In each of these examples the users representing the subject company who took action to skew public opinion simultaneously reduced their chances to collect valuable information as to how consumers view their company and how best to adjust their products, or services in relation to consumer needs. Moreover, due to the user controlled "comment and RSS" issues the journalist, or blogger, or referring user that represents the controversial content is left to feel helpless and discouraged in much the same way as people did prior to when consumer advocacy groups and class-action lawsuits formed to overcome such behavior off-line. Ultimately this issue negatively affects users as described herein as well as other participants that could benefit from the increased attention that centralized content with a high degree of user feedback could provide such as companies that desire to compete with better services, advertisers that wish to improve their ability to target users in relation to relevant subject matter, and publishers who are always looking for ways to engage users with compelling content.

The examples expressed herein indicate how people try to manipulate on-line systems for personal and corporate gain, but they also do so for notoriety. However, polling systems both on and off line can be used to shift the power of public opinion away from user minorities that attempt to skew public opinion towards the user majority that collectively acts in favor of the broader community.

For example, In 2007 Famous radio personality and host, Howard Stern, working in conjunction with the website votefortheworst.com tried to manipulate the voting process for the popular TV show American Idol. FOX has dominated primetime TV for many years with their hit show, American Idol, in which singers compete in a talent show format and the general public casts votes. Contestants that earn the most votes continue while those with less votes are rejected from further competition. American Idol supports a voting process whereby viewers can submit their votes on-line, or use mobile devices to vote by text message for example, or by calling an American Idol representative to cast their vote. Mr. Stern tried to rally his millions of radio listeners in an effort to get them to vote for the worst American Idol performer to win and, thereby, skew the voting outcome. This prompted a statement from a Fox spokeswoman who explained; "efforts like Mr. Stern's do not affect the results. With 30 million votes every week, and hundreds of millions of votes over the season, the power of true fans of 'American Idol' dwarfs any attempt of people trying to gain notoriety." In the end the best performer won because the American Idol fan base majority had a system in place to overrule the fan minority who were swayed by Howard Stern.

American Idol represents an example as to how the Internet, mobile devices, and widespread polling associated with a voting process can be used effectively to engage the viewer majority and subsequently over rule the agenda of a user minority when provided with a system enabling them to quickly and efficiently express their opinions in a structured manner.

Numerous Internet services exist today that enable users to submit their own content such as blogs, or refer published content to a central aggregation hub such as Digg.com, and to comment in reference to such content. Numerous websites also exist that enable users to express opinions about products and services such as Yelp.com. Yelp enables users to read customer reviews of local businesses such as restaurants. Another site, epinions.com, allows users to write product reviews. Numerous websites exist that poll users with questions on a per topic basis. Other services such as YahooAnswers.com allow users to ask questions for other users to answer. Then there are social-network providers such as Facebook.com, which enable users to connect based on pre-existing relationships, manage these relationships, and form affinity groups. The trend with regard to attracting interest to Internet content and engaging users is clearly towards enabling them to control the content. However, all of these services and others existing within the art provide features that can be manipulated by a user minority without oversight or accountability.

Nothing available within the existing art enables users to express themselves in relation to content in ways that can enable large scale response from the user majority within an Internet community quickly, and efficiently. The features they provide require a significant amount of time and attention from their users on an ongoing basis. As a result, an estimated 90% of users don't contribute directly they only review content referred, or published by a minority set of users, and do so within a highly fragmented and easily abused Internet services environment.

As a result of the issues expressed herein advertisers continue to struggle with complexities related to targeting their desired audience with offerings that are relevant to the user's interests or needs. This issue reduces user engagement and related revenues not just for advertisers, but for Internet content publishers, and other contributors such as journalists or bloggers as well. As a result Internet advertising networks resort to highly sophisticated methods of tracking user behavior on websites to improve their abilities to increase user engagement per ad. This frequently leads to an invasion of user privacy. Currently there are very few ways to target Internet advertisements with a high degree of relevancy based on the needs of Internet users, and fewer ways to do so without invading their privacy.

Despite the advances in Internet services designed to publish, or aggregate content such as videos, images, news articles, tweets, and weblogs, and for users to interact with such content there is a need for an Internet service that mitigates issues associated with user group minorities "burying" content for their benefit and without accountability by providing a system that highlights all popular content, especially the most controversial, and with a rating system that ranks content based on user attention whether that attention is positive, or negative.

There is a need to mitigate issues relating to a user minority leveraging Internet "comment and RSS" features to spread unsolicited offers e.g. spam, or to mislead or skew public opinion for their own benefit by providing a system designed to engage the broader user community e.g. majority and enable these users to work together on a large scale through collective oversight to quickly and efficiently express their opinions concerning topics of interest and the actions of the user minority.

There is a need for a system that can engage the broader user community in ways that enable the user majority to overrule a user minority regardless of the use of pseudonyms to protect identity, and for the benefit of the overall user community.

There is a need to mitigate issues relating to targeted advertising and user privacy invasion by collecting consumer feedback in the form of answers to survey questions relating to the subject matter of popular content on a scale large enough to make this data meaningful to advertisers, and organized into general categories based on the subject matter of the content so that advertisers can create campaigns based on how users responded to surveys in relation to content instead of continuing to collect the user's personal data.

There is a need for a system that can streamline and bring structure to the process of engaging the broader user community e.g. majority in ways that enable them to respond to controversial topics on a large scale quickly, efficiently, and effectively not only to provide the majority over-ruling the minority dynamic, but to enable users to form affinity groups in relation to controversial topics and mobilize in ways that benefit communities through driving organized change similar to how consumer advocates and class-action lawsuits leverage the combined interests of people.

These and other needs are addressed in this paper.

SUMMARY

A content management system can have one or more of an aggregation engine, a survey engine, a polling engine, an apparent-interest engine, an explicit-interest engine, and a results processing engine. A content aggregation engine enables users such as journalists or bloggers to publish content to a central hub, or users can refer on-line published content from third party websites such as videos, images, news articles, tweets, and weblogs to a central hub for other users to search, review, and interact with.

A survey engine enables a user that refers or publishes content to the hub to create their own survey questions pertaining to the published, or referred content (such as videos, images, news articles, tweets, and weblogs) so that other community members can quickly, efficiently, and effectively respond by answering the survey questions. By identifying popular content and polling the user community the system increases exposure of the content thereby benefiting publishers. By enabling the broader user community to rally around topics of interest on a large scale in a structured and efficient manner these users can work together to effectively address issues based on shared topics of interest. Additionally, the user survey data generated during polling enables advertisers to improve how they target their desired audience, and for publishers and journalists to earn revenues related to these enhanced advertisements.

A polling engine enables notification to the broader user community membership e.g. majority using methods such as email, or Short Message Service (SMS), or by changing indicia on a web browser to alert users to invite them to review subject matter and answer survey questions pertaining to the most popular content in a manner that is structured, efficient, and effective. This can enable users to participate in the polls and answer survey questions using devices such as a mobile phone, a Personal Data Assistant (PDA), a personal computer, or some other convenient device.

An apparent-interest engine enables identification of popular content, such as videos, images, news articles, tweets, and weblogs in ways that increases exposure for the referring users, publishers, journalists, and bloggers without allowing a user minority to bury such content thereby removing it from popular exposure.

An explicit-interest engine enables polled users to Identify the most popular content, such as videos, images, news articles, tweets, and weblogs as vetted by the interactions of the users; thereby qualifying the related subject matter for polling and to make answering related survey questions more efficient.

A results-processing engine enables compilation of user survey data whether generated over time regarding any survey, or during polling regarding the most popular content in ways that enable advertisers to improve how they target their desired audience, for publishers and journalists to earn revenues related to these enhanced advertisements, and/or for users to form affinity groups in relation to controversial topics and mobilize in ways that benefit communities through driving organized change similar to how consumer advocates and class-action lawsuits leverage the combined interests of people.

DETAILED DESCRIPTION

Figure 1:
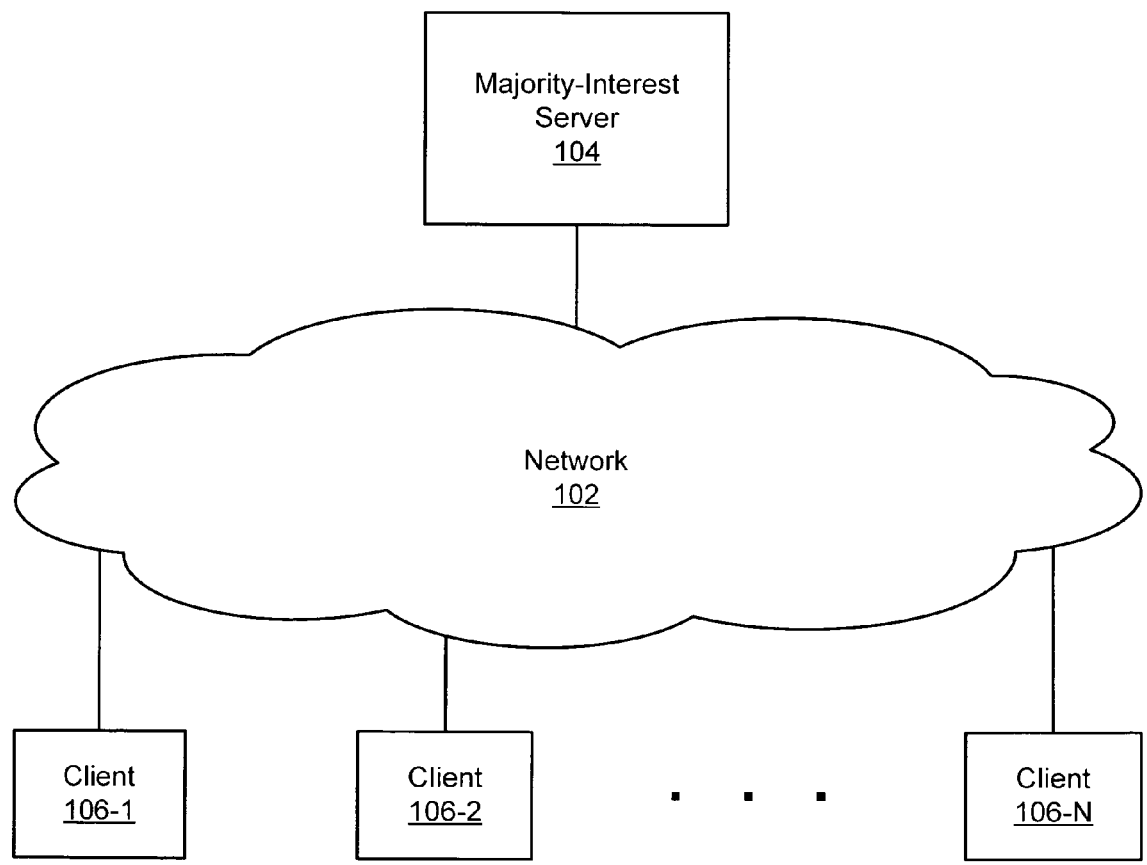
FIG. 1 depicts an example of a majority-interest content management system.

FIG. 1 depicts an example of a majority-interest content management system 100. The system 100 includes a network 102, a majority-interest server 104, and clients 106-1 to 106-N (collectively, clients 106).

In the example of FIG. 1, the network 102 can include a wired system or a wireless system. The wired system may consist of an individual wire, a LAN or, a WAN. The LAN and WAN may consist of any network topology available such as bus, token-ring, partial mesh, or fully meshed network. The LAN and WAN protocols may support any variety of protocols including Ethernet, TCP/IP, ATM, Frame Relay, 802.11, PPP and any OSI-based protocol. The network 102 can include a networked system that includes several computer systems coupled together, such as the Internet. The term "Internet" as used herein refers to a network of networks that uses certain protocols, such as the TCP/IP protocol, and possibly other protocols such as the hypertext transfer protocol (HTTP) for hypertext markup language (HTML) documents that make up the World Wide Web (the web). Content is often provided by content servers, which are referred to as being "on" the Internet. A web server, which is one type of content server, is typically at least one computer system which operates as a server computer system and is configured to operate with the protocols of the World Wide Web and is coupled to the Internet. The physical connections of the Internet and the protocols and communication procedures of the Internet and the web are well known to those of skill in the relevant art. For illustrative purposes, it is assumed the network 102 broadly includes, as understood from relevant context, anything from a minimalist coupling of the components, or a subset of the components, illustrated in the example of FIG. 1, to every component of the Internet and networks coupled to the Internet.

A computer system, as used in this paper, is intended to be construed broadly. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

The memory can include, by way of example but not limitation, random access memory (RAM), such as dynamic RAM (DRAM) and static RAM (SRAM). The memory can be local, remote, or distributed. As used in this paper, the term "computer-readable storage medium" is intended to include only physical media, such as memory. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

The bus can also couple the processor to the non-volatile storage. The non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software on the computer system. The non-volatile storage can be local, remote, or distributed. The non-volatile storage is optional because systems can be created with all applicable data available in memory.

Software is typically stored in the non-volatile storage. Indeed, for large programs, it may not even be possible to store the entire program in the memory. Nevertheless, it should be understood that for software to run, if necessary, it is moved to a computer-readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable storage medium." A processor is considered to be "configured to execute a program" when at least one value associated with the program is stored in a register readable by the processor.

The bus can also couple the processor to the interface. The interface can include one or more of a modem or network interface. It will be appreciated that a modem or network interface can be considered to be part of the computer system. The interface can include an analog modem, isdn modem, cable modem, token ring interface, satellite transmission interface (e.g. "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other I/O devices, including a display device. The display device can include, by way of example but not limitation, a cathode ray tube (CRT), liquid crystal display (LCD), or some other applicable known or convenient display device.

In one example of operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. The signals take on physical form when stored in a computer readable storage medium, such as memory or non-volatile storage, and can therefore, in operation, be referred to as physical quantities. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it should be appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical quantities within the computer system's registers and memories into other data similarly represented as physical quantities within the computer system memories or registers or other such information storage, transmission or display devices.

The algorithms and displays presented herein are not necessarily inherently related to any particular computer or other apparatus. Various general purpose systems may be used with programs to configure the general purpose systems in a specific manner in accordance with the teachings herein, or it may prove convenient to construct specialized apparatus to perform the methods of some embodiments. The required structure for a variety of these systems will appear from the description below. Thus, a general purpose system can be specifically purposed by implementing appropriate programs. In addition, the techniques are not described with reference to any particular programming language, and various embodiments may thus be implemented using a variety of programming languages.

Referring once again to the example of FIG. 1, in the example of FIG. 1, the majority-interest server 104 is coupled to the network 102. Servers, as used in this paper, can be a single server or multiple servers, or a blade or multiple blades within a server. An individual server may run a plurality of operating systems such as UNIX, Linux, Windows, AIX, VMS/VAX, or similar system. The majority-interest server 104 can be implemented on a known or convenient computer system, specially purposed to provide majority-interest content management functionality or other functionality described in this paper (collectively, the "majority-interest functionality"). Examples of majority-interest functionality are described in this paper. The majority-interest server 104 is intended to illustrate a server that has the novel functionality, but partial functionality might be provided by a first server and partial functionality might be provided by a second server, where together the first and second server provide the full server functionality.

Functionality of the majority-interest server 104 can be carried out by one or more engines. For example, the majority-interest server 104 can include one or more of an aggregation engine, a survey engine, a polling engine, an apparent-interest engine, an explicit-interest engine, and a results processing engine. As used in this paper, an engine includes a dedicated or shared processor and, hardware, firmware, or software modules that are executed by the processor. Each engine may reside on a single server or be distributed amongst a plurality of servers. An individual engine can also execute on a single sever or across multiple servers working in tandem with one another. Thus, depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Referring once again to the example of FIG. 1, in the example of FIG. 1, the clients 106 are coupled to the network 102. A client can include one or more devices that communicate with a server. The clients 106 can be implemented on one or more known or convenient computer systems, such as a computer, telephone, smart phone, personal data assistant (PDA), or other device, electronic or otherwise, that can communicate with the majority interest server 104. The clients 106 use the majority-interest functionality provided by the majority-interest server 104. Depending upon the implementation and/or preferences, the clients 106 can also carry out majority-interest functionality. Depending upon the implementation and/or preferences, in addition to or instead of using the majority-interest functionality provided by the majority-interest server 104, the clients 106 can provide or identify content or other useful data to the majority-interest server 104. The clients 106 can also be majority-interest-agnostic, and take advantage of majority-interest functionality without implementing any novel functionality on their own. It may sometimes be useful to draw a distinction between a client that is a contributor and a client that is a consumer. However, it should be noted that any of the clients can provide data (e.g., by answering a survey), and that a contributor is typically intended to mean a provider or identifier of content for aggregation and/or survey questions associated with content. Contributors may or may not have a different "class" of membership, which can further differentiate them from consumers. For example, contributors may have a paid membership, whereas consumers can access content for free and/or anonymously.

Figure 2:
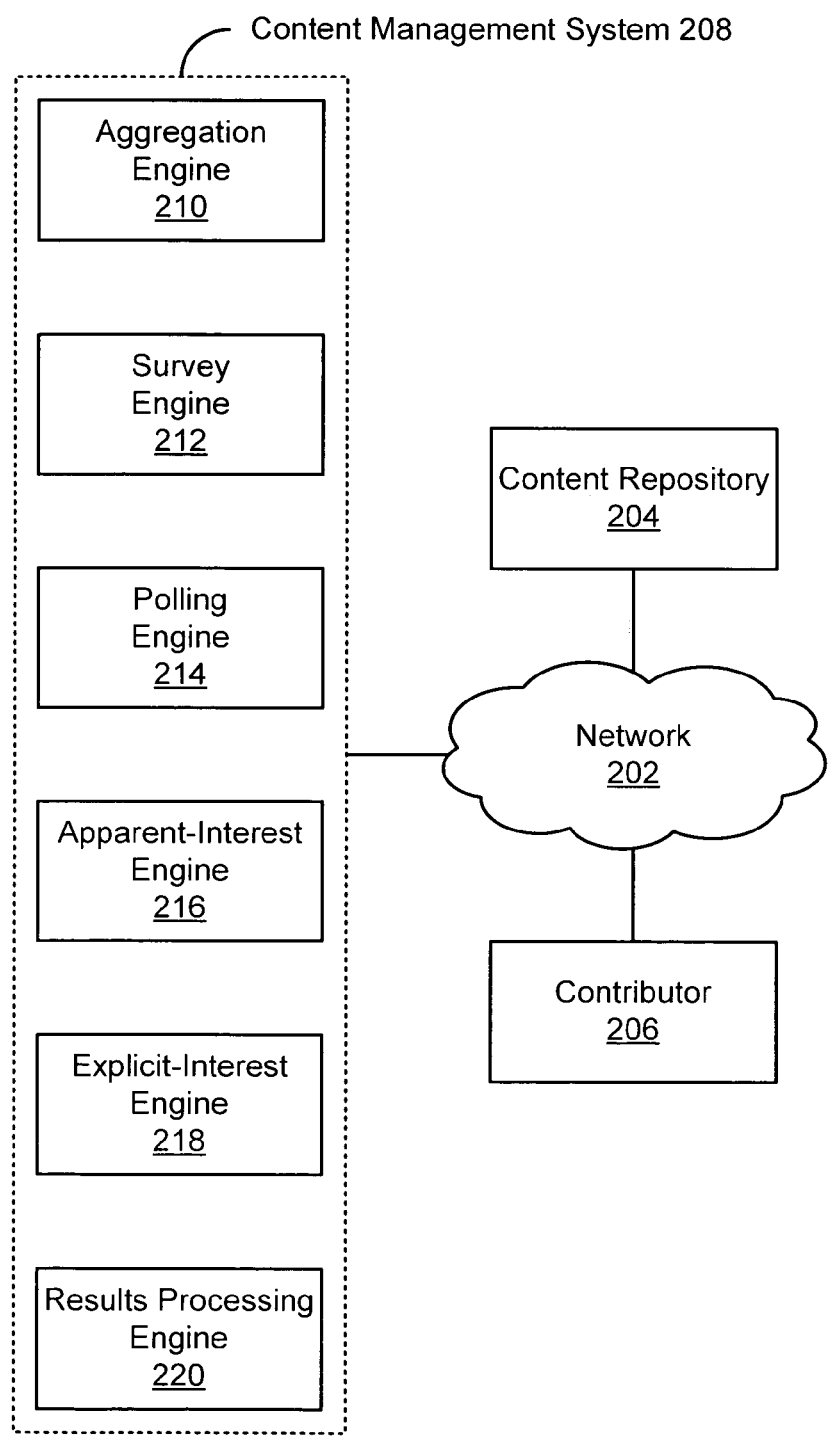
FIG. 2 depicts an example of a system including a content management system and a content contributor.

FIG. 2 depicts an example of a system 200 including a content management system and a content contributor. The system 200 includes a network 202, a content repository 204, a contributor 206, and a content management system 208. The network 202 can include any coupling of computer systems and is optional in the sense that the content repository 204, contributor 206, and content management system 208 could be implemented on a single device (though it is unlikely that all contributors, in an implementation that includes multiple contributors, will not be coupled to other components through the network 202).

In the example of FIG. 2, the content repository 204 is coupled to the network 202. A repository, as used in this paper, is intended to have the broadest reasonable meaning. Thus, the repository includes any data storage that allows meaningful access to the data. Examples of repositories include conventional commercial databases, as well as comma-delimited data files (or other equivalently delimited files), practically any data structure (e.g., objects, tables, arrays, etc.), and any other applicable structure that facilitates convenient access to data. For illustrative convenience, databases are also assumed to have the appropriate database interfaces, if needed. A repository can be centralized or distributed, and the data stored in the repository can be maintained by a single entity or by the owners of the data (perhaps with restrictions).

The content repository 204 can include videos, images, news articles, tweets, weblogs, and other content. It is expected that the content will normally be that which can be provided through a network, so the data will typically have an electronic format. Although it is theoretically possible to implement a system in which content includes a physical object or location (e.g., artwork in a museum) that has no electronic representation, in general the content will include at least some electronic data (e.g., a picture of the artwork in the museum). As used in this paper, the content is assumed to be the portion that can be provided through the network 202, and excludes any portion that cannot be provided through the network 202.

A content server associated with the content repository 204 may or may not actually maintain a copy of the content. For example, it is possible to logically aggregate content from multiple third party sites without maintaining a copy of the content. Thus, the content repository 204 can be a repository for copies of content that is maintained by a single party, or it can be a repository of content that is maintained by multiple different parties but aggregated logically. To be of optimal use, the content repository 204 should act as a "central hub" for other users to search, review, and interact with, regardless of the physical characteristics of the device or devices that make up the content repository 204. As such, the content can be thought of as "part of" the content repository 204 regardless of the physical location of the content.

In the example of FIG. 2, the contributor 206 is coupled to the network 202. The contributor 206 can be referred to, depending upon the context, as a human or a device. In this paper, the contributor 206 is assumed to be hardware or a combination of hardware and software. Thus, where the contributor 206 appears to be anthropomorphized, it is done for readability and it should be understood that an artificial agent is translating preferences, actions (perhaps taken by a human), or other applicable dynamic or static stimuli into data and controls for use by other components of the system 200.

In operation, the contributor 206 refers or publishes content to the content repository 204. The content, once referred or published, is at least logically located in the content repository 204. Depending upon the implementation and/or configuration, the contributor 206 may be able to update the content dynamically when the content changes. There may be some restrictions to content updating to ensure that majority-interests are met. For example, the contributor 206 (or the owner of content that the contributor 206 refers) might be prohibited from changing content after consumers have judged the accuracy, relevance, or some other characteristic of the content if the change would cause the judgment to become invalid, inaccurate, confusing, or nonsensical.

In the example of FIG. 2, the content management system 208 is coupled to the network 202. The content management system 208 includes a content aggregation engine 210, a survey engine 212, a polling engine 214, an apparent-interest engine 216, an explicit-interest engine 218, and a results processing engine 220.

The aggregation engine 210 aggregates the content provided by the contributor 206 into the content repository 204. For example, the content aggregation engine 210 can enable the contributor 206 to publish content to the content repository 204. Instead or in addition, the content aggregation engine 210 can enable the contributor 206 to refer on-line published content from third party websites to the content repository 204. The aggregation engine 210 should be capable of making the content searchable and useful to consumers of the content, tying data associated with the content to the content, adjusting content characteristics based upon majority-interests, and/or providing the data associated with the content to appropriate parties. Depending upon the implementation, it may be possible for un-vetted (e.g., anonymous) users to provide content and surveys.

The survey engine 212 enables a user that refers or publishes content to the hub to create their own survey questions pertaining to the published, or referred content (such as videos, images, news articles, tweets, and weblogs) so that other community members can quickly, efficiently, and effectively respond by answering the survey questions. The survey engine 212 can provide restrictions such as limiting question formats, limiting answer formats, limiting the number of questions in a survey, limiting one content item to one survey, requiring a minimum number of questions in a survey, moderating information (e.g., requiring approval of a survey), limiting the time or frequency of submissions, limiting content referrals such that only one URL pointing to referred content is allowed, or some combination. The survey engine 212 can also enable relatively free form survey creation, if desired. By identifying popular content and polling the user community the system increases exposure of the content thereby benefiting publishers. By enabling the broader user community to rally around topics of interest on a large scale in a structured and efficient manner these users can work together to effectively address issues based on shared topics of interest. Additionally, the user survey data generated during polling enables advertisers to improve how they target their desired audience, and for publishers and journalists to earn revenues related to these enhanced advertisements.

The polling engine 214 notifies users including the broader user community membership e.g. majority using methods such as email, or Short Message Service (SMS), or by changing indicia on a web browser to alert users to invite them to review subject matter and answer survey questions pertaining to the most popular content in a manner that is structured, efficient, and effective. This can enable users to participate in the polls and answer survey questions using devices such as a mobile phone, a Personal Data Assistant (PDA), a personal computer, or some other convenient device.

The apparent-interest engine 216 enables identification of popular content, such as videos, images, news articles, tweets, and weblogs in ways that increases exposure for the referring users, publishers, journalists, and bloggers without allowing a user minority to bury such content thereby removing it from popular exposure. In an embodiment, users can rate content items. Where there are multiple surveys per content item, users could also be allowed to rate surveys, which could have a bearing on which content-survey combination goes to the polling engine if there is sufficient apparent interest. In one embodiment, a contributor may be entitled to bypass the apparent interest engine 216 (and go straight to polling). In such an embodiment, it may be desirable to ensure that vetted users who participate in the poll are compensated in some way, such as by revenue sharing with the vetted users to compensate for participating in a vetted survey.

The explicit-interest engine 218 enables polled users to Identify the most popular content, such as videos, images, news articles, tweets, and weblogs as vetted by the interactions of the users; thereby qualifying the related subject matter for polling and to make answering related survey questions more efficient.

The results-processing engine 220 enables compilation of user survey data whether generated over time regarding any survey, or during polling regarding the most popular content in ways that enable advertisers to improve how they target their desired audience, for publishers and journalists to earn revenues related to these enhanced advertisements, and/or for users to form affinity groups in relation to controversial topics and mobilize in ways that benefit communities through driving organized change in a manner that is reminiscent of how consumer advocates and class-action lawsuits leverage the combined interests of people. In an embodiment, the results processing engine 220 can record how many survey participants were vetted as compared to un-vetted. For example, if un-vetted users respond to survey questions indicating displeasure with a company, the company may wish to change their ways or proclaim their innocence to the charges. The company can publish the changes or explanation and pay for a survey in which only vetted users participate to ensure that un-vetted (anonymous) users do not skew the results.

Figure 3:
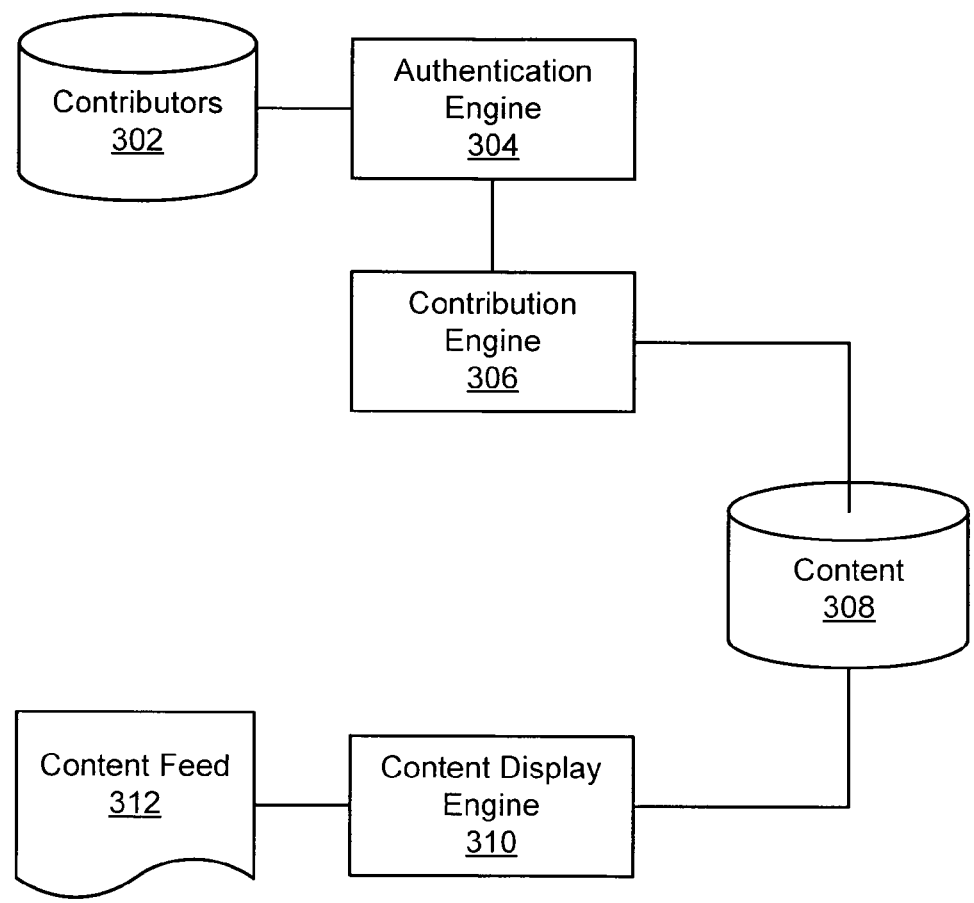
FIG. 3 depicts an example of a content aggregation system.

FIG. 3 depicts an example of a content aggregation system 300. In the example of FIG. 3, the content aggregation system 300 includes a contributors repository 302, an authentication engine 304, a contribution engine 306, a content repository 308, a content display engine 310, and a content feed 312.

The contributors repository 302 can include data about authors, editors, or other content provisioning agents. The contributors repository 302 can include data associated with a contributor account, including personal information used to authenticate a user as a contributor, such as a username, password, or passphrase. The contributors repository 302 can also include financial data such as user account payment information, account credits (for advertising, contribution, etc.), and an account identifier for associating a contributor with content.

The authentication engine 304 can use information provided by a contributor and the contributors repository 302 to authenticate a particular contributor. Depending upon the implementation and/or embodiment, authentication may be required to provide content for aggregation and evaluation by other users of the system, to associate content with survey data, or to provide content at all. Authentication need not be performed by the same party that aggregates content. For example, authentication could be performed through a third-party server coupled to the authentication engine 304 or at a non-local content server. Authentication can be accomplished through applicable known or convenient techniques, such as a username and password, secure token, pass phrase, PIN, biometric, key exchange, Needham-Schroeder protocol, IPSEC, KERBEROS, Microsoft Active Directory, or any available methodology to authenticate to a computer account. Once a contributor has been authenticated by the authentication engine 304, the contributor may be granted certain capabilities, such as providing content, associating content with a survey, etc.

In an embodiment, users must register in order to become contributors. Registration may include email, username, password, personal information (e.g., birth date, first name, last name) and preferences (e.g., keep real name private, display real name, notification when polls open, notification settings (email, SMS, RSS, etc.), and the like). Users may also be asked to accept terms, which may or may not be more stringent than for non-contributor users. The data can be stored in the contributors repository 302.

The contribution engine 306 can provide convenient tools for an authorized contributor to create or modify content, associate survey questions with content, view data associated with the content to ascertain popularity, relevance, income realized through the content, and the like. Depending upon the implementation, the contribution engine 306 can also offer tools for creating or managing content, such as blog creators, text editors, web page hosting, content display tools, multimedia composition tools, notification tools (e.g., to notify a contributor when a comment is received in association with provided content), survey question editors, and the like.

In an embodiment, a contributor can copy content or a link to the content (e.g., a URL) to the contribution engine 306. Depending upon the implementation, the contributor may also be prompted to enter a title, description of content, a category in which to place the content (e.g., from a choice of topics, by free association, etc.), or some other implementation- or configuration-specific data. The contributor may also be prompted to take other steps, such as checking other listings to make sure nobody has submitted similar content. Often, the contributor will be given the opportunity to preview the entry. The contributor may also be prompted to enter survey questions (see FIG. 4), which may or may not be required to complete the submission. The contributor may be given additional options, such as the option to preview the content entry, preview survey questions associated with the content entry, notify friends regarding the new content, and the like.

A contributor need not necessarily have any ownership of the content provided. For example, depending upon the implementation and/or configuration, a contributor could refer content from a third party with or without permission from the third party. Where content is provided without permission, it is advisable to be mindful of what constitutes fair use of content and to attribute content to the owner of the content.

The content repository 308 includes content associated with the contributor. The content repository 308 can be distributed. For example, content could be stored remotely (e.g., in association with a website associated with the contributor), while data associated with the content could be stored locally. Thus, the content repository 308 could include records that include a content identifier (such as a pointer to content or a location of remote content) along with a contributor identifier, an apparent interest value, and other data associated with the content.

The content display engine 310 can provide a framework for content in the content repository 308 to be organized in accordance with majority interest. New content will typically be associated with a poll question (see, e.g., FIG. 4), which may or may not be required initially, and an initial apparent-interest value. For simplicity, it is assumed that the initial apparent-interest value is zero. The apparent-interest value is most useful if it can represent a level of interest; so numbers or values that can be associated with numbers (e.g., whole numbers, integers, real numbers, alphanumeric characters, etc.) are the most obvious choices for apparent-interest values. The initial apparent-interest value need not be the lowest possible value. For example, some older content could be associated with lower apparent-interest than the initial value. Also, apparent interest can be initially set to different values for different content (e.g., an author that has a great deal of popular content could have an initial apparent interest value that is higher than an unknown author, current events could have greater initial apparent interest values than historical, etc.). On the other hand, there may be some interest in avoiding skewing results by initializing content to different apparent interest values. The decision is implementation- and/or configuration-specific.

An apparent interest value can be associated with content and all associated survey questions. Alternatively, multiple apparent interest values can be associated with content and multiple surveys and related questions. It may be desirable to aggregate apparent interest values where there is more than one survey associated with a single item of content. It may be desirable to know which of a plurality of surveys and related questions associated with a content item detected the most apparent interest. For example, it might be desirable to offer the multiple surveys per content item as an optional survey choice, and then pick the survey and related questions that garners the most responses for a poll.

The content display engine 310 can remove content items on the content feed 312 based on a triggered event or threshold being reached, such as low apparent-popularity as shown by the apparent interest, the passing of a certain amount of time in the content feed 312, or an event associated with the passing of time. Removing items from the content feed 312 is not a requirement, but it may be desirable for implementation- and/or configuration-specific reasons. Of course, where the content feed 312 is a limited subset of all content items, it may be necessary to remove items to make the list manageable and/or easy to display.

For illustrative purposes, the contributor is assumed to have no direct control over the content display engine 310. While the contributor is able to provide content and data associated with the content, at least in some cases, the contributor cannot directly modify content display results with any greater effectiveness than any other user. This enables the content display engine 310 to operate in an objective manner to prevent burying or swaying results.

The content feed 312 is a data structure that includes content submissions. The content feed 312 can be constructed using an applicable known or convenient technique, such as linked lists of content, an array of content identifiers, sorted objects, etc.

Figure 4:
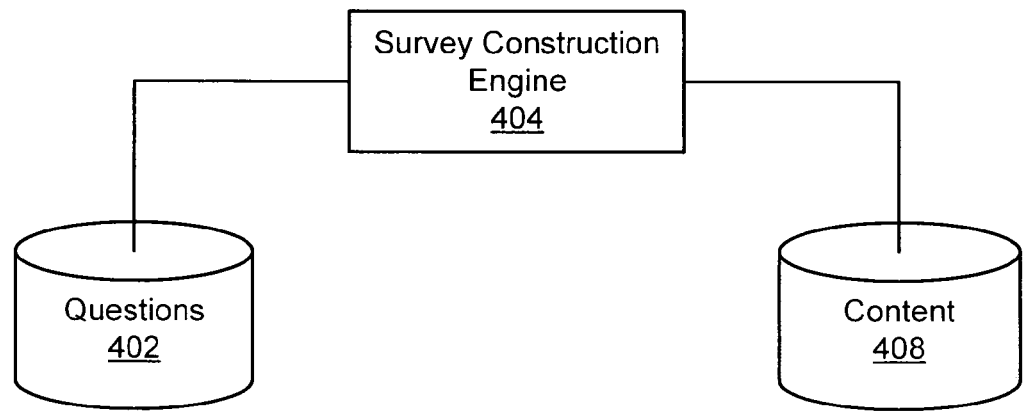
FIG. 4 depicts an example of a survey engine.

FIG. 4 depicts an example of a survey engine 400. In the example of FIG. 4, the survey engine 400 includes a questions repository 402, a survey construction engine 404, and a content repository 408.

The questions repository 402 can include a number of predefined questions, predefined formats with custom text, or custom questions. For example, the questions repository 402 can include the question: "What do you think of this content?" thumbs up/down/neutral, which a contributor could choose to apply to a submission. As another example, the questions repository 402 can include question formats, such as formats for yes/no, yes/no/maybe, date range, value range, dollar range, thumbs up/down/neutral, small/medium/large, vehicle type, etc., which a contributor could choose to apply to a submission along with custom text, such as "Would you change to a credit card company if they had fixed due dates?" As another example, the questions repository 402 can include questions of a custom question format and custom text, such as "Who is your favorite author?" and a list of several authors.

The survey construction engine 404 enables a contributor to create survey questions associated with the submission. Depending upon the implementation and/or configuration, a contributor can select a question or question format and/or enter a question in association with a submission. Where the question is not predefined, the survey construction engine 404 can store the question in the questions repository 402. A contributor may also have contributor-specific options, such as saved preferences for question formats, a list of custom questions created previously by the contributor, and the like.

It is probably desirable to enable quick, efficient, and effective responses; so the survey construction engine 404 would ideally be designed to accomplish this goal. For example, the survey construction engine 404 could enable a contributor to see what a question will look like in a poll as a "preview." In an embodiment, answers are checkboxes to facilitate easy tallying of results and to take as little response time as possible. However, it may also be desirable to let users enter a number (perhaps to be averaged with numbers entered by other respondents). In an embodiment, contributors could be given the option of moving the questions around or timing questions to correspond to content that is being played. For example, questions could be located near a relevant paragraph of a relatively long article or fade in during a relevant portion of a speech or song.

The content repository 408 is much as described previously. The survey construction engine 404 may or may not store data in the content repository 408, but the distinction is inconsequential because the questions repository 402 and the content repository 408 can be thought of as a single repository. However, it may be the case that questions are only stored in association with content and the questions repository 402 only includes predefined questions, if any, while all other questions are stored in content records in, e.g., a content database.

Figure 5:
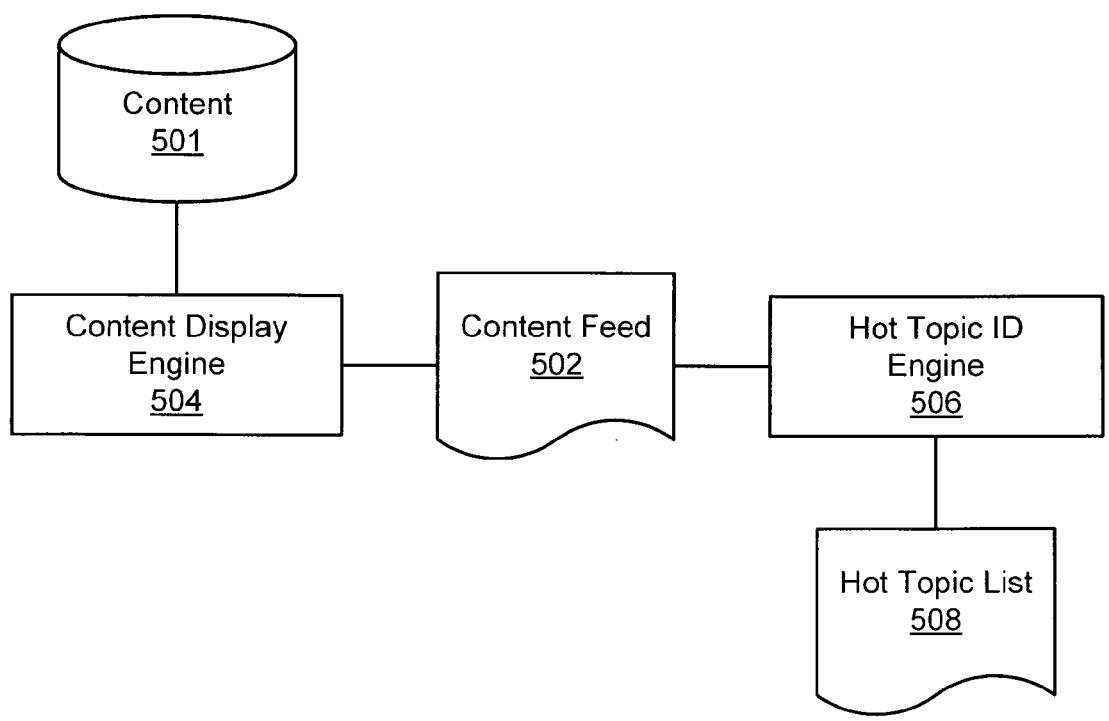
FIG. 5 depicts an example of an apparent-interest engine.

FIG. 5 depicts an example of an apparent-interest engine 500. The apparent-interest engine 216 enables identification of popular content, such as videos, images, news articles, tweets, and weblogs in ways that increases exposure for the referring users, publishers, journalists, and bloggers without allowing a user minority to bury such content thereby removing it from popular exposure. In the example of FIG. 5, the apparent-interest engine 500 includes a content feed 502, a content display engine 504, a hot topic ID engine 506, and a hot topic list 508

The content repository 501 includes the content and relevant associated data. The content feed 502 includes a list of content items, which can be a subset of the content in the content repository 501. The content feed 502 does not have to be a "feed" in the technical sense, but is a list of content items that changes over time, generally but not necessarily based upon the age of the displayed content.

The content display engine 504 can display the content items from the content repository 501 in the content feed 502 in association with viewing or ranking options. For example, the content items can be associated with options such as comments, share, report, like (i.e., thumbs up), more, link to a wiki, survey, contributors, and the like. A "more" option is frequently desirable because content cannot be displayed in a list if the content is relatively large, as is the case for blogs and text entries of more than a few lines. As selections are made in association with a content item, the apparent interest value of the item increases. Different interactions with the content may be weighted the same or differently. For example, sharing a content item might be given more weight than commenting, commenting on an item may be given more weight than clicking "like," clicking "like" may be given more weight than clicking "more," etc. Weight can also be given to, for example, clicks on "like" in association with comments (as opposed to clicks on "like" in direct association with the content item itself. The considerations of weight can be implementation-specific, and may depend on the type of content, the forum, or other considerations. In an embodiment, the content items are listed by date (with the most recent content items at the top), with an apparent-interest value displayed next to the content item. The content items could also be listed by interaction date such that most recent items are put at the top of the list, but interaction with older items moves them to the top of the list. In an embodiment, interacting with a contact item may cause the item to rise in the list rather than automatically moving it to the top, giving weight to both how recently the content item was posted and interactions with the content item.

In an embodiment, the content display engine 504 can display survey questions in association with the content items. In another embodiment, a view can be provided that identifies contributors. Contributors can include not only the provider of the content item, but also those who interacted with the content item in some way. Advantageously, even though the user contributors are anonymous, it is possible to build a profile for the user based upon interest in various topics. So advertisers may be able to target such users even though they have access to no personal information. Moreover, vetted users can be identified by the system without necessarily disclosing any personal information. This may give their opinions more weight to other users, and the system could consider vetted user interaction with content to have greater weight than that of unvetted users. Moreover, it may be that vetted users are more invested in the system because providing personal information implies greater interest and trust. So vetted users might also be more likely to respond to polls. So weighing vetted user interaction with content more heavily could conceivably result in greater turnout in polls since hot topics are more likely to have more vetted users.

The hot topic ID engine 506 can select a subset of the content items in the content feed 502 and survey questions associated with the content items. (It should be noted that the hot topic ID engine 506 conceptually selects content items from the content feed 502, but might actually consider only entries in a content repository with, for example, the highest apparent interest values.) The selected subset can be thought of as content items that are promoted due to gaining the most attention through either direct promotion or indirect criteria. Negative attention can be weighted as heavily as positive attention to ensure that attempts to bury a content item with negative comments will not be successful, and can in fact cause the hot topic ID engine 506 to select the content item. It could be argued that in some cases it might even be desirable to weight negative attention more than neutral or positive attention, though this would be an implementation-specific consideration.

The hot topic ID engine 506 can create the hot topic list 508 using the selected subset of content items in the content feed 502. The hot topic list 508 is a data structure that includes content that has an apparent interest value, an apparent interest value that falls within a range, or an apparent interest value that qualifies for listing (e.g., the top 10 content items could be listed). The hot topic list 508 can be constructed using an applicable known or convenient technique, such as linked lists of content, an array of content identifiers, etc. The hot topic list 508 can include the content items with the highest apparent interest values (though the value could be used in a function that does not always result in a list that has the highest of the apparent interest values making the hot topic list 508). In this way, the hot topic list 508 could represent the top 10 hottest content items of a category or overall. The hot topic list 508 could be displayed in much the same manner as the content feed 502.

Figure 6:
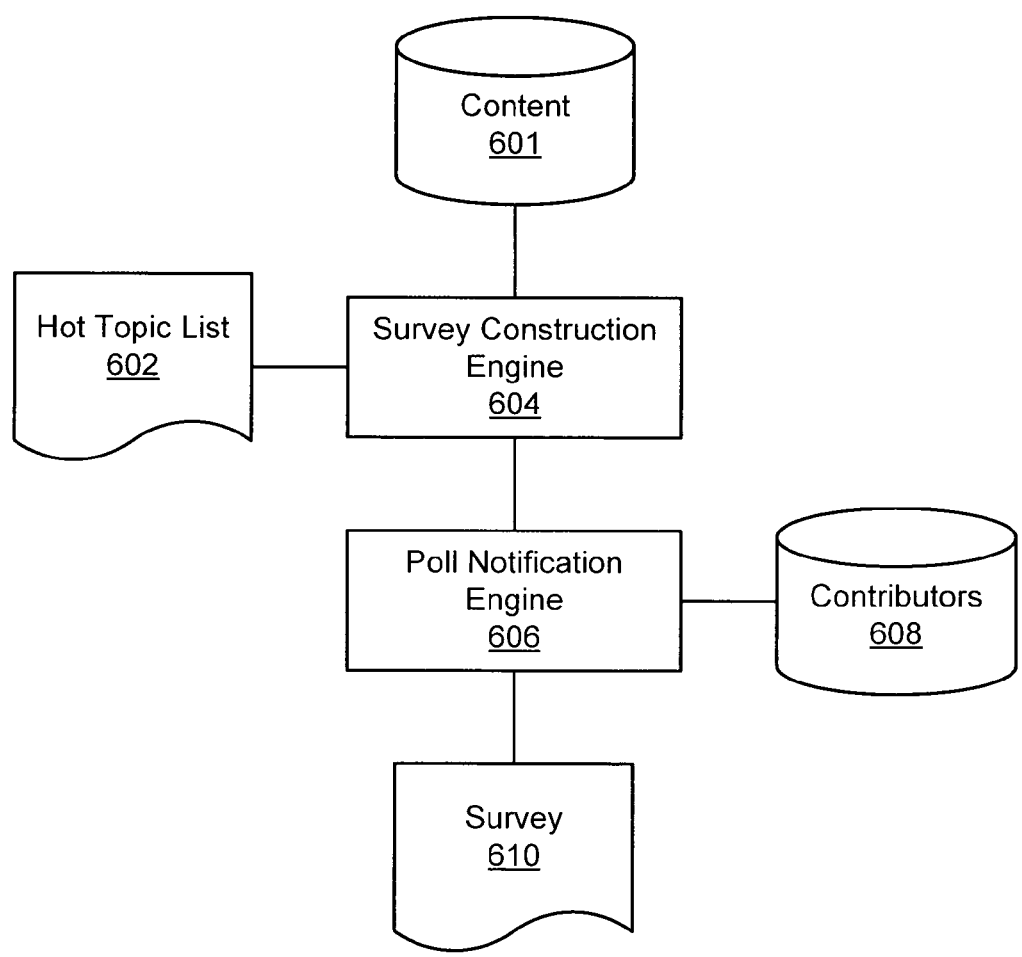
FIG. 6 depicts an example of a polling engine.

FIG. 6 depicts an example of a polling engine 600. In the example of FIG. 6, the polling engine 600 includes a content repository 601, a hot topic list 602, a poll construction engine 604, a poll notification engine 606, a contributors repository 608, and a survey 610.

The hot topic list 602 includes the content items from the content repository 601 having the highest apparent interest.

The survey construction engine 604 constructs a survey periodically or aperiodically in accordance with implementation- and/or configuration-specific parameters. For example, the survey construction engine 604 could construct a survey once every week or once every month, the survey construction engine 604 could construct a survey when the hot topic list has a content item that exceeds a threshold or a combination of content items exceed a threshold, or the survey construction engine 604 could construct a survey using other considerations, such as relatively high or low apparent interest in other categories, recent interest in topics on other forums, or some other consideration.

When the survey construction engine 604 constructs a survey, it matches the content items found in the hot topic list with survey questions. In an embodiment, the content or a link to the content and survey questions associated with the content are stored in the content repository 601. The survey construction engine 604 can construct surveys into one or more applicable formats, such as would be appropriate for sending in an email, for display on a relatively small screen, such as a cell phone display, via SMS, web page display, or in some other convenient format.

The poll notification engine 606 checks the contributors repository 608 for notification preferences. Notification preferences can include categories of interest, preferred format for surveys (e.g., email, SMS, changing indicia on a web browser to invite the user to an open poll, etc.), batch or individual survey delivery, and the like. It should be noted that contributors need not be content providers, and can be users who have an account that includes no personal information. In this context, they become contributors because they have their notification settings set such that they contribute survey responses. The poll notification engine 606 makes the survey 610 available in an appropriate format to each user having the appropriate notification settings. The users can then participate in polls and answer survey questions using devices such as a mobile phone, a PDA, a personal computer, or some other convenient device.

Figure 7:
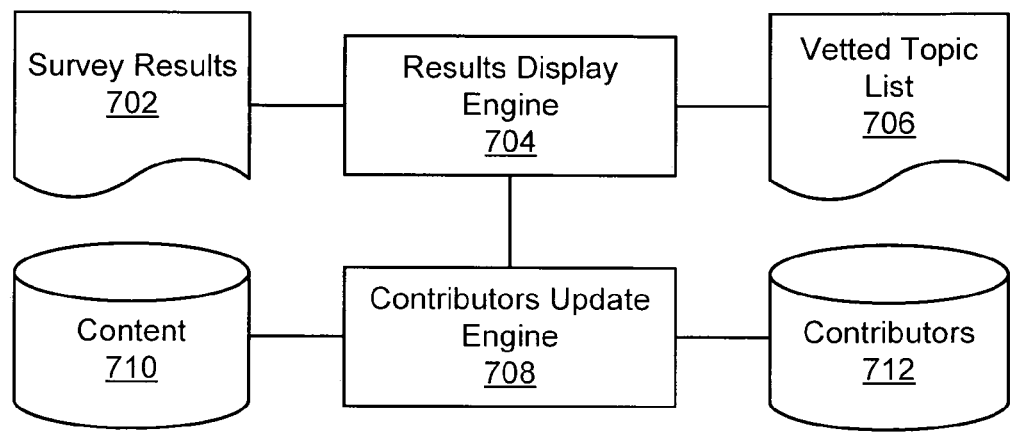
FIG. 7 depicts an example of a results processing engine.

FIG. 7 depicts an example of a results processing engine 700. In the example of FIG. 7, the results processing engine 700 includes a survey results 702, a results display engine 704, a vetted topic list 706, a contributors update engine 708, a content repository 710, and a contributors repository 712.

The survey results 702 are the results of surveys sent to applicable contributors.

The results display engine 704 compiles the survey results 702 and outputs the results to the vetted topic list 706. The vetted topic list 706 could replace the hot topic list (FIG. 5), or it could be displayed as a stand-alone list. It may be desirable to present the hot topics and vetted topics list to enable users to see the difference between a vocal minority (the apparent interest list) and the (hopefully) majority. It may be desirable to remove the hot topics from the hot topics list (and keep them off of the hot topics list) to reduce the likelihood of polling the same topics repeatedly. If the hot topic list is updated as apparent interest changes, it may be desirable to maintain the vetted topics list 706 for historical purposes. In an embodiment, the vetted topics list 706 lists the most frequently answered questions first, or the questions could be organized in some other fashion (e.g., the most lopsided answers first, such as 95% yes, 1% no, 4% maybe).

There is no particular time limit by which a user would necessarily have to respond, and the results display engine 704 could continue to compile results as they are received. At some point, however, it may be desirable to close the polls. In another embodiment it may be advantageous for polls to open and close in a relatively short period of time such as within one day or one week to encourage prompt participation by users.

The contributors update engine 708 can update the content repository 710 with the vetted content information. Vetted content information is information that takes on added significance because it has been provided through a polling process that reduces the impact of vocal minorities. Contributors may then be able to access vetted information in association with the content they provided. The contributors update engine 708 can also update the contributors repository 712. For example, users who participate in the survey could be associated with their responses to enable the building of a profile associated with the users without the use of any personal information. Users can also be ranked or earn credit based upon participation.

Vetted users, as opposed to vetted content information are those users that can be associated with a real-world identity. The confidence required to consider a user vetted is implementation- or configuration-specific. For example, a system may require a real name and address that is tied to a credit card, a name and address tied to a telephone number, or some other information that establishes identity to some degree. Vetted users may be considered to have more weighty opinions in some cases. For example, a content contributor may care more about the opinions of users that are vetted than those that are not. In an embodiment, a user can be identified as vetted (such as by putting a star next to the user name) without necessarily disclosing any personal information. Alternatively, vetted users may wish to give their real name when providing opinions or contributing content if desired. In a system implementing techniques described in this paper, it is anticipated that protecting personal information will be a high priority to encourage participation. So the disclosure of personal information is likely to be by choice rather than by default.

Figure 8:
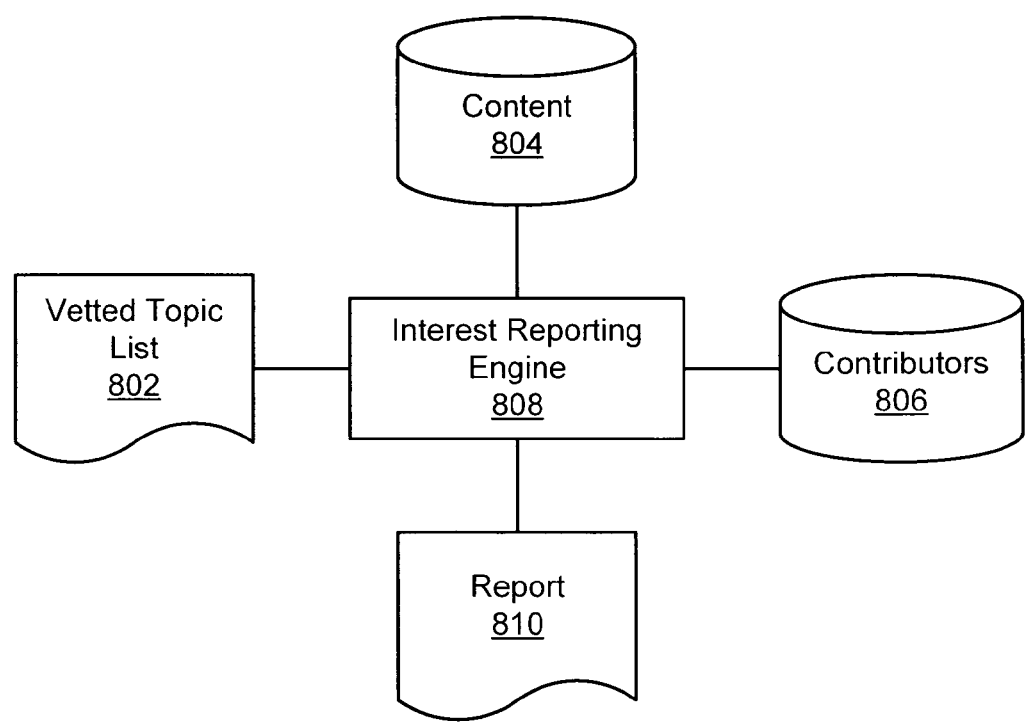
FIG. 8 depicts an example of an explicit-interest engine.

FIG. 8 depicts an example of an explicit-interest engine 800. In the example of FIG. 8, the explicit-interest engine 800 includes a vetted topics list 802, a content repository 804, a contributors repository 806, an interest reporting engine 808, and a report 810.

The vetted topics list 802 can be displayed or archived for reporting purposes for a duration that is implementation- and/or configuration-specific. The content repository 804 can include content entries that are updated in accordance with apparent interest and vetted interest. The contributors repository 806 can include content contributors and data contributors that are update with each contribution, or a subset of the contributions. Advantageously, contributors who wish to provide no personal information can do so, while their contributions are still allocated to their accounts. The interest reporting engine 808 can use this data to determine what is of most interest to those who are viewing similar content, those who are most similar to other users who have indicated an interest in a topic. Some users may even wish to state explicitly where their interests lie by category or keyword. Then the interest reporting engine 808 can generate a report to inform a party requesting the report regarding actual views (vetted) rather than vocal minority views on a topic, what content is of greatest interest in general, which types of users prefer which types of content, and all with relative anonymity (at least for the majority users).

The explicit-interest engine 800 enables polled users to identify the most popular content, such as videos, images, news articles, tweets, and weblogs as vetted by the interactions of the users; thereby qualifying the related subject matter for polling and to make answering related survey questions more efficient. By identifying popular content and polling the user community content that might otherwise have been buried can get increased exposure, thereby benefiting publishers. By enabling the broader user community to rally around topics of interest on a large scale in a structured and efficient manner these users can work together to effectively address issues based on shared topics of interest. Additionally, the user survey data generated during polling enables advertisers to improve how they target their desired audience, and for publishers and journalists to earn revenues related to these enhanced advertisements.

Figure 9:
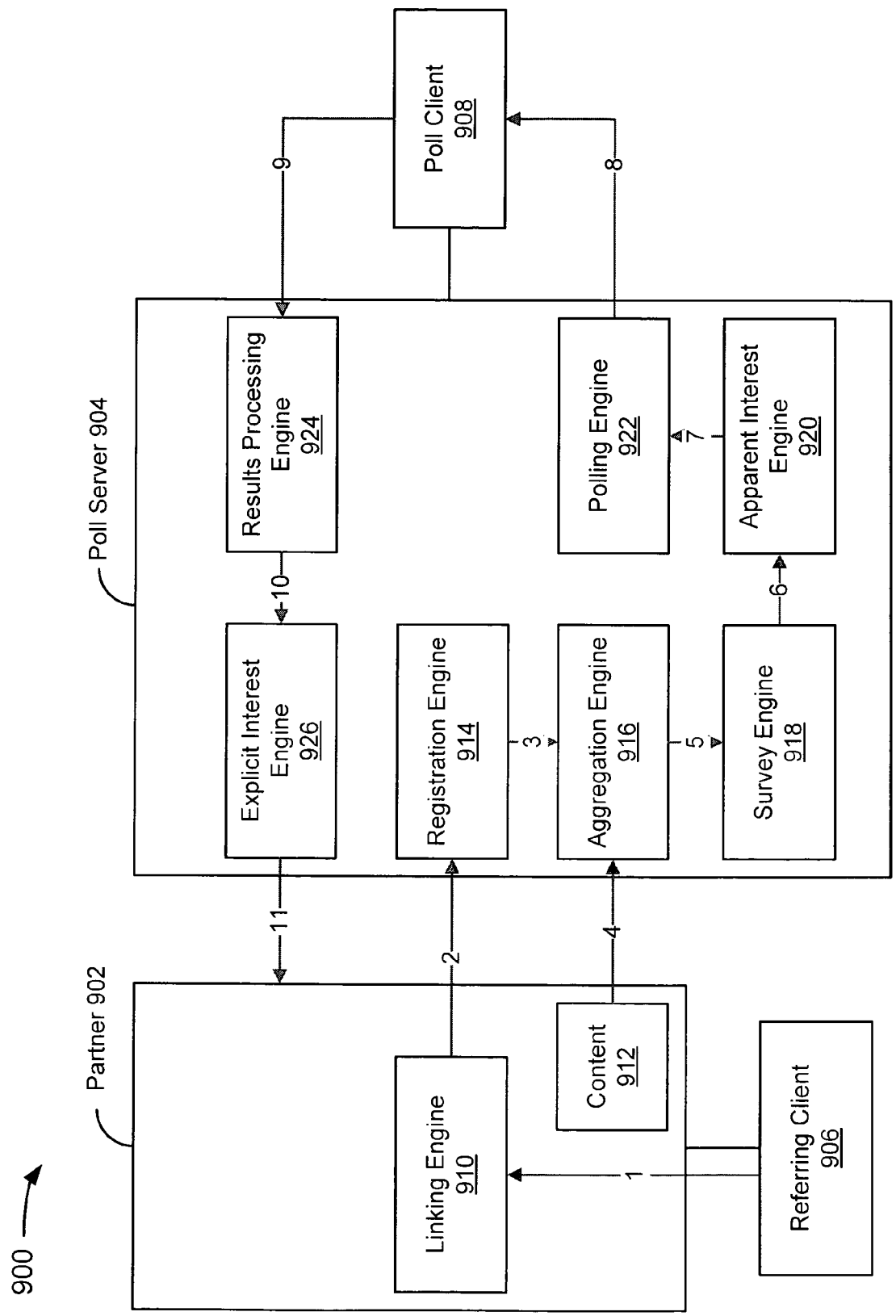
FIG. 9 depicts an example of system in which a website can partner with a poll server.

FIG. 9 depicts an example of system 900 in which a website can partner with a poll server. In the example of FIG. 9, the system 900 includes a partner 902, a poll server 904, a referring client 906, and a poll client 908.

The partner 902 can be a system that includes a content server at least for clients of the partner 902, such as, in this example, the referring client 906. The partner 902 includes a linking engine 910 and content 912. The linking engine 910 can be provided by a party associated with the poll server 904 (e.g., an API), or it can be created by a party associated with the partner 902 to provide a link to the poll server 904. The linking engine 910 can be made available to all clients of the partner 902 or a subset thereof, and it can be made available in association with all content provided by the partner 902 in its capacity as a content server, or a subset thereof. As indicated by the conceptual flow arrow 1, the referring client 906 uses the linking engine 910 to establish a link to the poll server 904 through the conceptual flow arrow 2.

The poll server 904 can be a system that includes content aggregation and polling functionality at least for clients of the poll server 904, which can include, at least to some degree, any user device that has the capability to go to a website of the poll server 904. The poll server includes a registration engine 914, an aggregation engine 916, a survey engine 918, an apparent interest engine 920, a polling engine 922, a results processing engine 924, and an explicit interest engine 926. The registration engine 914 registers the referring client 906 as a contributor. As indicated by the conceptual flow arrow 3, control is then passed to the aggregation engine 916.

If the partner 902 is trusted, the referring client 906 could be given vetted status by the poll server 904 without receiving any personal information (or less personal information than would normally be required to have vested status) in association with the referring client 906. Thus, the registration engine 914 can generate vested user accounts without needing to ask for personal information, which could conceivably have scared off users who trust the partner 902, and have given the partner 902 their personal information, but who do not know the parties associated with the poll server 904. It is likely that users who have provided personal information to any of the linked parties will be more invested in a system that treats them as vested even if no personal information is provided. Moreover, depending upon the implementation, content contributors may be required to provide certain information to the poll server 904, but the partner 902 can essentially vouch for the referring client 906, enabling the use of a user name to tie the referring client 906 to an account having details that are unknown to the poll server 904, but that is sufficient to enable the poll server 904 to set up a vested account nevertheless.

The aggregation engine 916 enables the referring client to identify refer the content 912 to the aggregation engine either by providing a URL, a copy, or through some other convenient technique. The conceptual flow arrow 4 illustrates the content 912 or a link to the content 912 being aggregated at the aggregation engine 916. As illustrated by the conceptual flow arrow 5, the aggregation engine 916 passes control to a survey engine 918 which obtains survey questions from the referring client 906 or an agent associated with the referring client 906. The aggregation engine 916 and the survey engine 918 can conceptually be combined when aggregation is considered to include aggregation of both content and the associated data, and can actually be implemented to obtain the different types of data in any order or in parallel.

When the content and associated data has been collected, control passes to the apparent interest engine 920 (conceptual flow arrow 6), which makes the content and some of the associated data available to clients, typically including unregistered clients (not shown) that are coupled to a website associated with the poll server 904 to view content. The apparent interest engine 920 gauges apparent interest in the content 912 (and other content) over time. If apparent interest in the content 912 passes an interest threshold, or is above a certain threshold when polling begins (conceptual flow arrow 7), the polling engine 922 sends survey data to poll client 908 (conceptual flow arrow 8). It is assumed for illustrative purposes that the poll client 908 responds to the survey (conceptual flow arrow 9), providing the results processing engine 924 with data. The results processing engine 924 stores the data in appropriate locations, such as contributors repositories, content repositories, vetted interest lists, etc. and control passes to the explicit interest engine 926 (conceptual flow arrow 10), which reports to the partner 902 (conceptual flow arrow 11) regarding explicit interest in the content, data about users interested in the client (though in an embodiment without sharing personal information), or the like.

Advantageously, this can give the partner 902 greater visibility, a better understanding of user interest in content, and additional revenue if the business model includes a revenue sharing agreement with partners; a contributor associated with the referring client 906 can gain some economic benefit from advertisements displayed in association with the content, satisfaction from becoming a contributor, and access to other content at the poll server 904; the poll server site can gain additional contributors (such as the referring client 906), additional content (such as the content 912), and additional revenue from increased interest by advertisers thanks to increased traffic; the poll client 908 can stay on top of the highest interest content, gain satisfaction from contributing, and receive more targeted ads that may include products or services in which a contributor associated with the poll client 908 has an interest.

Figure 10:
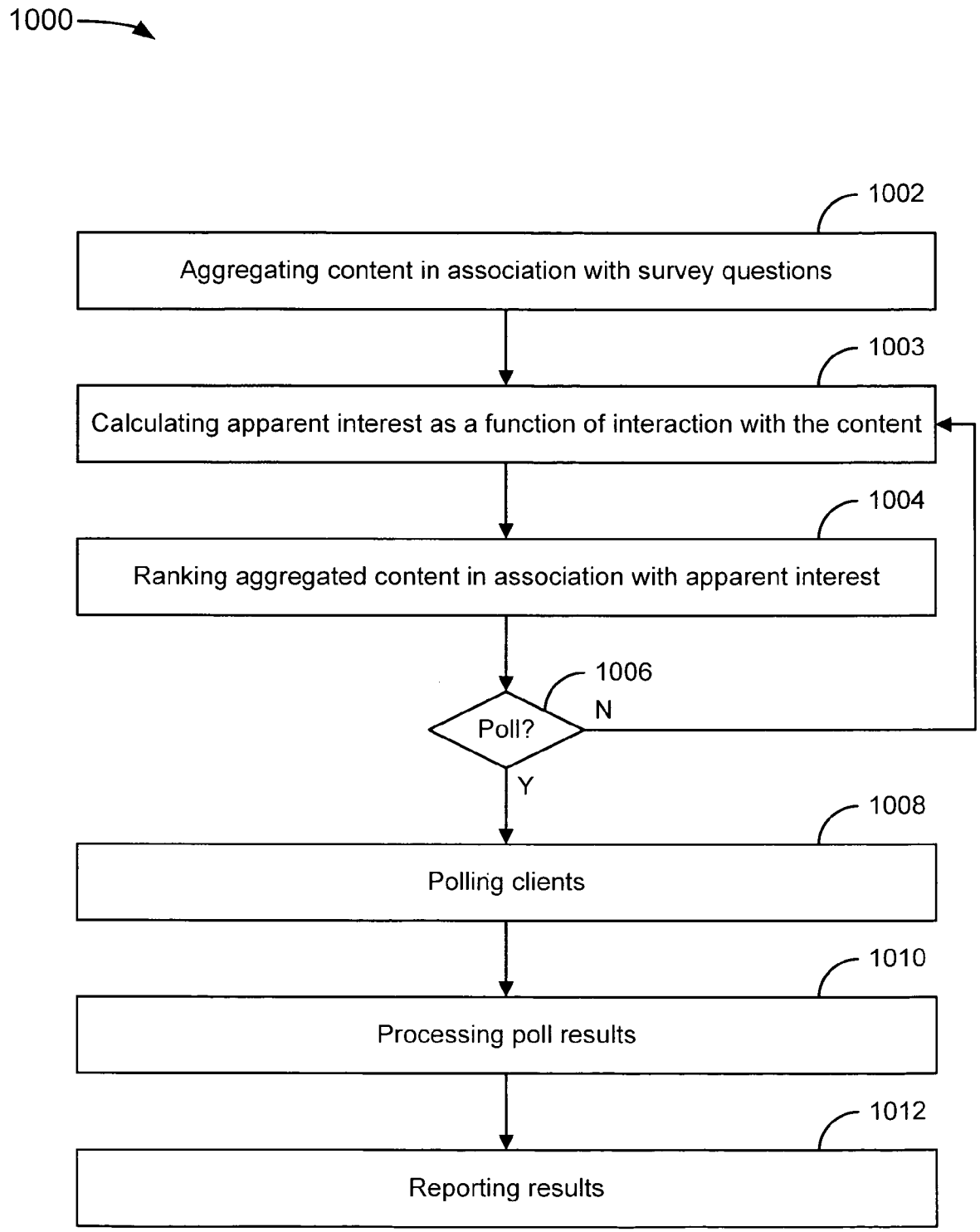
FIG. 10 depicts a flowchart of an example of a method for content vetting.

FIG. 10 depicts a flowchart 1000 of an example of a method for content vetting. The method is organized as a sequence of modules in the flowchart 1000. However, it should be understood that these and modules associated with other processes and methods described herein may be reordered for parallel execution or into different sequences of modules.

In the example of FIG. 10, the flowchart 1000 starts at module 1002 with aggregating content in association with survey questions. The content, or an identification of or a link to the content, can be provided by a content contributor. The content contributor may or may not be the content creator or co-creator (e.g., an author, journalist, musician, artist, blogger, or other creator of content). The content contributor may or may not be the content provider. Indeed the content contributor might just be lucky enough to have stumbled across some interesting content and contributed with a link to the content. The content contributor may or may not also provide the survey questions with which the content is aggregated. In some implementations, the content contributor may have to provide the survey questions when contributing the content, but in other implementations the content contributor could have someone else provide the survey questions.

In the example of FIG. 10, the flowchart 1000 continues to module 1003 with calculating apparent interest as a function of interaction with the content. Apparent interest can be calculated in a number of ways. One convenient technique involves allowing users to answer the survey questions. This is convenient because the survey questions were already provided in association with the content; so it is easy to display the questions in an effort to garner responses. Answering survey questions about content is also often a clear signal of interest in the content, whether positive or negative. Other techniques may include clicking on anything associated with the content on a content display. For example, if a user clicks "more" to view more of the content than is displayed, then that could be given some weight in gauging apparent interest. Users could also indicate they "like" the content, share the content, or interact with the content in some other way. Each of the interactions can be given the same weights or different weights depending upon the implementation. It should be noted that "no weight" is considered a weight in this context. For example, if a user interacts with the content but it is somehow possible to determine that the interaction was accidental, then the interaction might be given no weight.

A simple function for calculating apparent interest is a sum of equally weighted interactions. The function could include any manipulation of values, though it may be desirable to implement a function that is convenient for a computer to calculate. Different types of interaction with the content may be weighted differently, and it may even be desirable to weight positive and negative interaction differently in some cases. However, as the state of the art shows, weighing positive and negative interest differently can result in bias.

Negative interest is not disinterest. It is relatively well-known that in ranking sites almost anywhere on the Internet, negative reviews can be used to drag content down. The "bury brigades" of digg.com are but one example. On amazon.com, fans of a particular author or game can mark dissent as not of interest to most (and you actually have to click on the review that was hidden to be able to see it). It takes a very small vocal minority to accomplish these goals. For this reason, interest is better calculated using both positive and negative interactions with content. In the amazon.com example, it might be worthwhile to know when hidden reviews are read because it could be indicative of a general distrust of the visible reviews.

In the example of FIG. 10, the flowchart 1000 continues to module 1004 with ranking aggregated content in accordance with apparent interest. Rankings can fluctuate over time. So, if the highest rankings in a time period are to be polled, it may be desirable to maintain a top 10 list the includes only the highest apparent interest over a time period, rather than just the current top 10. That way, even if one of the content items drops to below the top 10 by the time a poll opens, it will be polled because it was at one time during the period higher than a current content item in the top 10. Alternatively, it may be desirable to simply poll the top 10 content items taken as a snapshot when the poll opens. As another alternative, the content items might only decrease (due to aging) at the time a poll opens so that the highest apparent interest over a period of time is the highest apparent interest at the time the poll opens. Another option with ranking is to not use aging at all (or with limits). This can enable content items that have continuous apparent interest to eventually float to the top even if they never reach a fever pitch of interest.

In the example of FIG. 10, the flowchart 1000 continues to decision point 1006 with determining whether to poll. If it is determined not to poll (1006-N) then the flowchart 1000 returns to module 1004 and continues as described above. Determining whether to poll is implementation-specific. For example, it may be desirable to poll based upon the passage of a certain amount of time. Daily polls might be interesting if only the hottest topics are polled, but otherwise it might be desirable to spread polls out over a longer time frame (weeks or even months). With a sufficiently large sample size, you could conceivably poll different topics with different users, or allow users to indicate how frequently they want to be involved in polls; some will almost certainly want to be involved in polling more often than others. The apparent interest across multiple content items could be a reason to accelerate polling. Real world cycles could increase or decrease the polling rate, could be another (e.g., in a politics forum, it might be desirable to increase the polling rate near election dates). If compensation is offered to those who participate in polls, the polling rate could probably be increased, as well. In some implementations, content contributors might be able to pay to have their content polled, which could trigger an immediate poll, and the users who respond to the poll might be compensated for their participation.

If, on the other hand, it is determined to poll (1006-Y), then the flowchart 1000 continues to module 1008 with polling clients. Depending upon the implementation and/or configuration, one or both of vetted (known) and un-vetted (anonymous) clients can be polled. Either type of client can have a profile built for it based upon responses to polls (and interactions with content items and ads). Since the content items to be polled have the highest apparent interest values, which means more users probably helped to increase the apparent interest value, users are more likely to be interested in the results of the poll. Also, if there was an attempt to bury the content with negative comments, or make posting comments of a certain nature unpleasant, which will tend to drive some users away from a content item (at least the comments section), then the negative interest will help float the content item to the top and give it a fresh start, perhaps by wiping the older comments.

In the example of FIG. 10, the flowchart 1000 continues to module 1010 with processing poll results. Different parties will find different value in the poll results. The content contributor might be interested in how popular the topic is or how there was an unsuccessful attempt to bury the content (e.g., by providing negative feedback, thereby raising the apparent interest of the content item, triggering a poll). An advertiser might be interested in how successful the contributor is with garnering interest in content, or what categories of users are interested in particular content. A user might want to establish a profile so that ads are more appropriate or they get credit for contributions.

In the example of FIG. 10, the flowchart 1000 continues to module 1012 with reporting results. The report can enable comparisons of content from the content contributor with other content from the content contributor, the number of stars assigned by a vocal minority with the number of start from the polled majority, the interest in poll contributors with other content, the interest of poll contributors with one another, majority opinions regarding a content item with subjective opinions, and other applicable comparisons.

What is claimed is:

1. A method, executed by a processor, the method comprising:
   aggregating, by the processor, content items in association with a plurality of surveys related to a respective plurality of content items;
   calculating, by the processor, apparent interest as a function of interaction with the respective content items, wherein the function includes survey responses for the respective surveys;
   ranking, by the processor, aggregated content items by apparent interest;
   polling, by the processor, clients using surveys for a first subplurality of the aggregated content items that are ranked higher than a second subplurality of the aggregated content items;
   processing, by the processor, poll results for the first subplurality of the aggregated content items, wherein the processing of the poll results includes associating survey responses with the polled clients;
   reporting, by the processor, the poll results.

2. The method of claim 1, further comprising:
   opening a poll prior to polling the clients;
   closing the poll after a predetermined time period, wherein responses to polling are excluded when processing poll results for the poll.

3. The method of claim 1, further comprising:
   receiving survey questions and a set of answers to each of the survey questions;
   closing the poll after a predetermined time period, wherein responses to polling are excluded when processing poll results for the poll.

4. The method of claim 1, wherein interaction with the respective content items used to calculate apparent interest includes anonymous interaction.

5. The method of claim 1, wherein the content items are tagged, further comprising recommending content items with similar tags to content items for which interaction is identified.

6. The method of claim 1, further comprising opening a poll for a first content item instead of a second content item with a higher apparent interest when the second content item was in a prior poll.

7. A content management system comprising:
   a memory configured to store a content datastore;
   at least one processor configured to provide instructions to execute:
      an aggregation engine, coupled to the content datastore, configured to facilitate storage of a content item in the content datastore;
      a survey engine, coupled to the content datastore, configured to facilitate the creation of a survey pertaining to the content item, wherein the survey is customized in association with the content item;
      a content display engine, coupled to the content datastore, configured to include an indication that the survey pertaining to the content item can be taken and to make the content item and the indication available;
      an apparent-interest engine, coupled to the content datastore, configured to consider factors including interaction with content items to generate apparent-interest values for the content items;
      a polling engine, coupled to the content datastore, configured to invite interaction with the content item and the survey during a polling period for a subset of the content items that have apparent-interest values that exceed an apparent interest threshold;
      an explicit-interest engine, coupled to the content datastore, configured to display the content item as vetted by interaction with the content item during the polling time frame;
   wherein, in operation:
      the aggregation engine stores a first content item in the content datastore, the first content item having a ranking higher than a second content item, the ranking based on apparent interest for the first content item and the second content item;
      the survey engine stores a first survey pertaining to the first content item in the content datastore, wherein the first survey is customized in association with the first content item;
      the content display engine includes an indication that the first survey pertaining to the first content item is available, makes the first content item and the indication available, and receives first one or more survey responses from first one or more users responsive to the first survey pertaining to the first content item;
      the apparent-interest engine considers interaction with the first content item by at least the first one or more users to generate a first apparent-interest value for the first content item;
      the polling engine invites participation in a first poll pertaining to the first content item during a first polling period when the first apparent-interest value exceeds an apparent-interest threshold;
      the explicit-interest engine displays results of the first poll in association with the first content item.

8. The system of claim 7, the aggregation engine further comprising:
   a contributors' datastore;
   an authentication engine, coupled to the contributors' datastore, configured to use data in the contributors' datastore to authenticate a contributor;
   a contribution engine, coupled to the content datastore, configured to store a content item comprising electronic content or a link to electronic content, in the content datastore;
   wherein, in operation:
      the authentication engine authenticates, using data in the contributors' datastore, a contributor;
      the contribution engine receives the first content item from the contributor after authenticating the contributor, associates the first content item with the contributor, and stores the first content item from the contributor in the content datastore.

9. The system of claim 7, the survey engine further comprising:
   a survey questions datastore;
   a survey construction engine, coupled to the survey questions datastore, configured to facilitate creation of survey questions;

wherein, in operation, the survey construction engine generates first survey questions pertaining to the first content item and stores the first survey questions in the survey questions datastore;

wherein the first survey pertaining to the first content item includes at least one of the first survey questions.

10. The system of claim 7, the content display engine further configured to display surveys with content items, wherein, in operation, the content display engine displays the first survey with the first content item.

11. The system of claim 7, wherein the first apparent-interest value of the first content item exceeds the apparent-interest threshold, wherein, in operation, the apparent-interest engine identifies a hot topic list including the first content item and the second content item with second one or more apparent-interest values that exceed the apparent-interest threshold.

12. The system of claim 7, wherein the first poll includes at least a portion of the first survey.

13. The system of claim 7, the polling engine further comprising a poll notification engine configured to send alerts when polls open, wherein, in operation:

the poll notification engine notifies a group of users consisting of a subset of the first one or more users, second one or more users, and a combination thereof;

the polling engine receives first one or more poll responses from the group of users;

the explicit-interest engine displays results of the first poll derived from the first one or more poll responses.

14. The system of claim 7, further comprising a results processing engine configured to generate a vetted topic list using results of the first poll and second one or more polls pertaining to second one or more content items and notify contributors associated with the first content item and the second one or more content items regarding one or more topics in the vetted topic list.

15. The system of claim 7, wherein the explicit-interest engine is configured to display the content item as vetted by receiving answers to survey questions pertaining to the content item from users during the polling time frame.

* * * * *